United States Patent

Wuth

[11] 4,210,441
[45] Jul. 1, 1980

[54] METHOD FOR THE CONTINUOUS OR DISCONTINUOUS TREATMENT OF MOLTEN SLAG, PARTICULARLY WITH CONTENTS OF HEAVY METAL OXIDES, FOR THE RECOVERY OF PORTIONS CONTAINED THEREIN OF VALUABLE METALS OR THEIR COMBINATIONS, RESPECTIVELY

[76] Inventor: Wolfgang Wuth, Berlin, Fed. Rep. of Germany

[21] Appl. No.: 838,723

[22] Filed: Oct. 3, 1977

[30] Foreign Application Priority Data

Oct. 6, 1976 [DE] Fed. Rep. of Germany ....... 2645585

[51] Int. Cl.[2] .......................................... C22B 25/00
[52] U.S. Cl. .......................................... 75/24; 75/85
[58] Field of Search .......................................... 75/24, 85

[56] References Cited

U.S. PATENT DOCUMENTS

| 3,634,069 | 1/1972 | Worner | 75/85 |
| 3,902,895 | 9/1975 | Wuth | 75/76 |

FOREIGN PATENT DOCUMENTS 465531 1/1974 Australia ..................................... 75/85

Primary Examiner—M. J. Andrews
Attorney, Agent, or Firm—Hill, Van Santen, Steadman, Chiara & Simpson

[57] ABSTRACT

A method and mechanism for treatment of molten slag having heavy metal oxides for the recovery of valuable metals contained therein through precipitation during slag melting and volatilization out of the slag bath including blowing reaction gases through a nozzle in a vertical jet with substantial force down onto the surface of the slag melt generating a torus movement of the slag material and forming a depression in the surface of the slag causing a reacting contact between the gas of the jet and the slag and causing a torus movement in the molten material beneath the slag and adjusting the vertical position and force of the jet so that the induced flow in the material beneath the slag is in the range of 2 to 5 times greater than the horizontal diameter of the depression in the slag surface caused by the jet.

6 Claims, 1 Drawing Figure

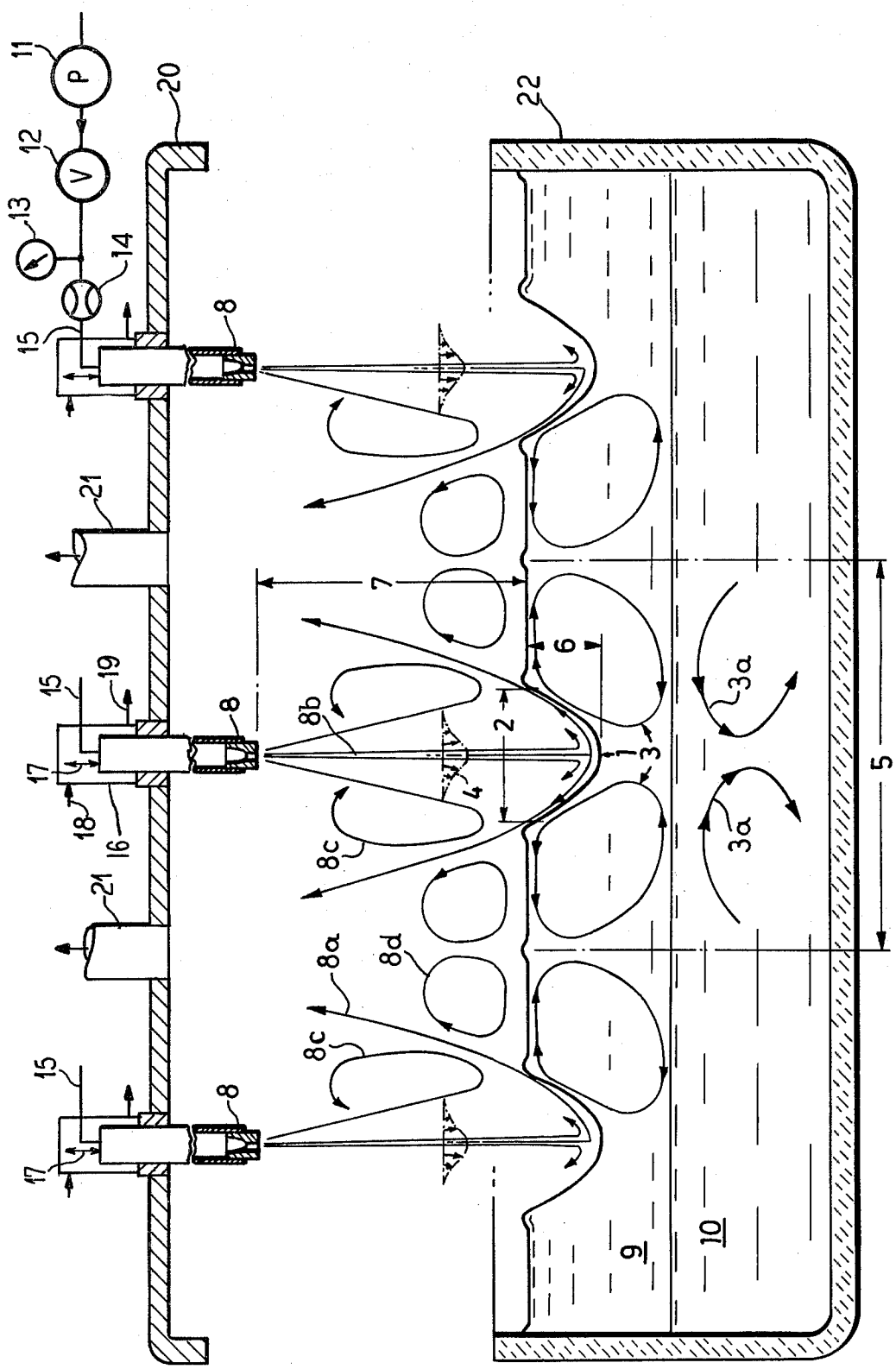

METHOD FOR THE CONTINUOUS OR DISCONTINUOUS TREATMENT OF MOLTEN SLAG, PARTICULARLY WITH CONTENTS OF HEAVY METAL OXIDES, FOR THE RECOVERY OF PORTIONS CONTAINED THEREIN OF VALUABLE METALS OR THEIR COMBINATIONS, RESPECTIVELY

BACKGROUND OF THE INVENTION

The invention relates to improvements in methods for the continuous or discontinuous treatment of molten slag particularly having contents of heavy metal oxides for the recovery of valuable metals from the slag.

More particularly, the invention pertains to the treatment of molten slag with contents of heavy metal oxides for the recovery of the metal portions contained therein through precipitation or deposit during the slag melting bath or volatilization out of the slag melt.

The method employed in mechanism is different than that illustrated in German Patent D 2,306,398 entitled "Method for the Treatment of Molten Non-Ferrous Metals, Particularly Copper, through Blowing with Reaction Gases". The present invention relates to the treatment of oxidic melts or slags.

In accordance with the present invention, a jet of reaction gas is directed downwardly onto the surface of the slag to move the slag and cause a reaction between the gases and slag material. The metal bath or molten material beneath the slag is brought into induced movement by movement of the slag. The jet stream which is directed onto the upper surface of the slag, however, is not directed in such a manner as to penetrate through the slag layer and does not reach the metal bath beneath the slag but solely penetrates into the slag to form a depression a depth optimal for dynamic reasons for movement of the slag and movement of the bath therebelow.

In contrast to mechanisms and methods utilizing blowers for the recovery of steel, there is no mixture of slag and gas and metal, but the method employs a torus-type parallel flow in the slag and molten material and a reaction and heat transfer is achieved. This type of relative flow of the materials has not been utilized with methods of non-ferrous metal production or refining such as those known and used commercially as Worcra, Inco, TBRC, Mitsubishi, or with other slag-blowing methods.

In accordance with the prior teachings of the art, the separation of valuable metal contents from molten slag of predominantly oxidic low-grade concentrates, intermediary, and waste products or the like is attained by means of blowing in reaction gases horizontally into the melt and through volatilization in rotary reverberatory furnaces. If additionally non-volatilizable valuable metals are contained, processes recover these metals though treatment in a blast furnace with a hot charge. The volatilized valuable metals, such as antimony, lead, zinc, or tin occur in this method in oxidic form and are collected in filters connected in series. The residual melt consists of a concentratable slag with low valuable metal contents. The non-volatilizable valuable metals occur in a separate crude metal phase or with sufficient sulphur in a sulphide phase.

For the separation of volatilizable constituents, cyclone furnaces have also been employed.

In accordance with the method of the present invention, materials such as the following are advantageously treated: tin, lead, antimony, and bismuth-containing low-grade concentrates, particularly when they contain pyrites. Concentrates melting with difficulty may be accommodated by means of additions. Suitable intermediary products are for example, crude slags, which occur with the recovery of tin or with the preparation of copper-scrap-metal. The latter can be separated into three products, namely, tin-containing oxide mixture, raw copper and depositable and concentratable slag. Examples of waste products are tin, lead, copper-containing end-slags, tin and iron-containing waste metals or dross and zinc-containing lixiviation residues.

The invention obtains through the insuring of a reproduceable good material heat conditions which are advantageous as well as the possibilities of technically obtaining ease of regulation of operation parameters. Such parameters are nozzle pressure gas supply, nozzle spacing and gas composition and gas volume, and these can be controlled and constructed for continuous methods at favorable investment costs. The invention also offers the possibility of being utilized inexpensively in existing furnaces even if necessary with discontinuous run-offs of the process.

It is accordingly an object of the present invention to provide an improved method and apparatus for the treatment of non-ferrous slags containing heavy metal oxides for the recovery of valuable metals therefrom.

A further object of the invention is to provide an improved method and apparatus for the recovery of valuable metals from slag which can be utilized in mechanism which is readily controllable during operation, can be used for continuous or intermittent operations, can be utilized in existing furnaces, and can be adopted without substantial investment.

Other objects and advantages, as well as equivalent methods and structures, which are intended to be covered herein, will become more apparent with the teaching of the principles of the invention in connection with the description of the preferred embodiment in the specification, claims and drawings, in which:

DRAWINGS

The single FIGURE of the drawing is a somewhat schematic sectional view taken through a structure and operating in accordance with the principles of the present invention.

DESCRIPTION

The drawing illustrates somewhat schematically the technical features of the method and it will be understood that more sophisticated and refined apparatus will be used in actual commercial installation, although the drawing will provide those versed in the art with a full teaching of the principles of the invention. A furnace installation may contain one or more reaction systems in accordance with the invention and these may be connected in series or in parallel. The reaction system 5 is formed by means of the convective conditions in the gas jet and slag melt. The system consists of a nozzle 8 having a jet of gas issuing therefrom. A plurality of nozzles will be positioned equally spaced above a slag 9 and these will be spaced preferably uniformly as will later become more clear. The jet of gas issuing from the nozzle has the character of having the highest speed in the core of the flow as indicated by the flow velocity graph shown at 4. The force of the stream or jet of gas is generally dependent upon the pressure of the gas which is delivered to the nozzle, and the vertical spacing of the nozzle of the surface of the slag 9. The reaction gas is delivered to the nozzles from a gas pressure source such as a pump 11. The supply reaction gas flows through connecting lines indicated generally at 15 to the individual nozzles 8. By control of the pressure of the gas delivered may be obtained through a regulating or control valve of a conventional type shown at 12. Flow volume may also be regulated through a volume regulator 14 which may also be supplied with indication means to provide a readout to the control operator as to the volume of gas being delivered to the nozzles. A pressure indicator 13 gives a readout of pressure delivered to the nozzles for the operator. The nozzles may be arranged in parallel arrangement so that all nozzles receive the same pressure and same volume of gas flow and if desired individual balancers and individual lines may be provided for compensating for flow friction to ensure uniform delivery to each of the nozzles 8.

The nozzles are provided with water cooling jackets 16 which have water through-put flow lines 18 and 19 for maintaining the nozzles at a satisfactory operating temperature and preventing their being overheated from the heat of the slag and the gases rising therefrom as indicated generally by the arrowed lines 8a.

A hood 20 is arranged to extend over the expanse of the slag 9 for removal of gases and the hood is provided with suitable conduits 21 which may be provided with blowers for an exhaust system.

The material being treated is contained in a container 22 with a metal bath at 10 and the slag 9 on the surface thereof.

The jet nozzles 8 direct a jet or reaction gas shown schematically at 8b downwardly to form a concave depression 1 in the surface of the slag. The depth of the depression does not penetrate the slag 9 and causes a torus-shaped circulation or movement of the slag adjacent to the depression 1 with the torus circulation being indicated generally by the arrowed lines 3.

A feature of the invention is the induced flow caused in the molten metal as indicated by the arrowed lines 3a. That is, the torus-shaped flow induced by the jet-caused depression 1 circulates the entire depth of the slag 9 and at the line of demarcation between the slag 9 and metal bath 10 flow is induced in the metal along the lines 3a. The intensity of the jet stream 8b is selected, in accordance with the principles of the invention, to obtain a certain relationship between the torus-shaped circulation 3 in the slag and the circulation 3a in the metal, and this is controlled by regulation of the height of the jet, the jet pressure, and the jet volume. By maintaining the relationships in accordance with the principles described herein it has been discovered that a balance exists between the reaction capabilities of the gas added by the jet and the reaction relationship between the gases flowing in the jet 8b, the slag 9, and the molten metal 10.

The reaction system is generally defined by means of the convective conditions in the gas jet and melt. The force of the streamer jet primarily dependent upon nozzle supply pressure and nozzle spacing of the slag brings about the depression 1 having a diameter 2 and a depth 6. The jet depression and the flow of gases from the jet bring about through friction between the moving gases and air the torus-shaped circulation 3. At the contacting surface between the slag 9 and the metal bath 10 the material in the bath is induced to move in a parallel manner. Additionally to the metal bath 10 or in its place with sufficient sulphur activities a sulphide phase may also be present.

In addition to the convective relationship between the gas and the slag 9 the jet also has the effect of transporting or conveying and moving gaseous reaction materials onto the slag and transporting away gaseous reaction products from the slag. The reaction products may have already been converted at the limit of their reaction to the vapors or dust or may later react with exhaust gases, in any event improved contact for reaction is attained and the various arrowed lines on the drawing above the slag 9 indicate the circulation paths induced and created including a torus-shaped circulation 8b in the reaction gas above the surface of the slag and an annular recirculation path 8c at the side of the jet which may extend down into the depression caused in the slag.

In accordance with the reaction desired the composition of the gas jet may be provided to contain different components. For example, oxidizing gases may be employed such as oxygen, reducing gases, or hydrogen or inert gases may be used for example such as nitrogen. Of a greater interest however, will be gas mixtures of oxidizing and reducing gases which supply to the slag melt, in addition to reaction components, heat energy through combustion. Mixtures technically particularly suitable for this type of reaction are natural gas with oxygen, propane gas with oxygen, petroleum with oxygen and like mixtures. Each mixture according to quantity conditions will act oxidizingly or reducingly on the melted slag bath. In certain cases the addition of sulphur dioxide or $SO_2$ or hydrogen sulphide $H_2S$ is also suitable.

When a discontinuous or intermittent operation is employed the utilization of the gas composition for the treatment of the slag melt is important. Heat and material transfer steps during processing a charge are in accordance with the process for the slag melt to be optimized. Accordingly in many cases it will be necessary to proceed in the beginning in an oxidizing manner and proceed gradually to neutral and later to a reducing reaction, whereby through exact and controlled adjustment of the gas mixture the formation of undesired oxidic or sulphide containing phases may be prevented. This is attained by the control of the gas supplied to the inlet line to the pressure pump 11.

When a continuous operation is utilized the use of several reaction systems is preferred which may run constantly with a different gas composition.

The reaction system 5 which is illustrated in the drawing embodies in general a construction utilizing the following apparatus. As will be recognized by various mechanical modifications and equivalents of the various structures may be employed.

A. A vertically movable shaft or support for the jet operated by suitable mechanical device such as a screw jack or rack and pinion indicated schematically at 17. Gas delivery to the nozzle would have pressure in volume for measuring the devices.

B. An outlet hood for gathering vapors and dusts which rise and this would be sucked up into a filter system. The jet would be located in the hood.

C. A vessel or container for the slag in the molten metal having critical dimensions. The crucible or container may be provided with a trough and parts of a reverbatory furnace or other known furnace used as components.

The relationship between the dimensions is such that the diameter of the torus indicated at 5 which is taken perpendicular to the direction of the jet, is in the range of 2 to 5 times the diameter 2 of the jet induced depression in the slag. In a preferred relationship the diameter 5 will be three times the diameter 5 of the depression.

The nozzle employed is preferably a Laval type nozzle which is known to those versed in the art.

In commercial structures preferably a plurality of jets will be employed which will be uniformly spaced over the surface of the slag. The spacing of the jets is such that the space between adjacent jets is preferably in the range of 2 to 3 times the diameter of the torus as indicated at 5 and preferably 3 times said diameter.

EXAMPLE

Low grade compound tin ore with 15% tin may be separated or disassociated by means of blowing with reducing gas mixtures into a concentratable slag and an oxide mixture, which contains in addition to tin, also andemony, lead, bismuth, zinc etc. Through the addition of small quantities of $SO_2$, the speed of volitilization and the production of tin is improved, the residual contents of tin in the slag then amount to some tenths of percent. In the case of pyride containing an automatic concentrates additions are not necessary.

High grade slags from the tin recovery with 10–15% tin to the method of the invention likewise detin to about 0.3% is pyride is added to the slag or the gas jet contains $SO_2$ or $H_2S$.

High grade slags from copper waste product processing have both high copper as well as tin contents. Upon the treatment with a reducing propane oxygen mixture these slags may be disintegrated or separated into a raw copper, a copper and tin low grade slag as well as into an oxide mixture which contains tin.

End slags of some pyrometallurgical methods frequently contain for example zinc, tin, lead, andemony and copper in concentrations which lie still above the mining recovery limit. However neither through technological preparation hydrometallurgical or pyrometallurgical methods may they be economically further lowered. In some cases, it is possible through addition of a blowing unit into the existing type of procedure, to remove these valuable metal contents in the manner inducing recovery from the slag.

I claim as my invention:

1. A method for treatment of molten slag having heavy metal oxides for the recovery of valuable metals contained therein through precipitation during the slag melting and volatizing out of the slag melting bath, said slag floating on and completely covering a molten material bath, said method comprising the steps:

blowing reaction gases through a nozzle in a vertical jet with substantial force down onto the surface of the slag melt to form a depression in the surface of said slag while still maintaining a continuous cover over said molten material bath, thereby causing a reaction contact between the gas of the jet and the slag and generating a torous movement of the slag material adjacent said depression, while causing upward blowing of gases;

inducing a torus movement in the liquid molten material beneath the slag adjacent said jet-formed slag depression by said torus movement of said slag; and adjusting the force of the vertical jet acting on the slag so that the horizontal diameter of the induced flow in the molten material beneath the slag is in the range of 2 to 5 times greater than the horizontal diameter of said slag depression and the depth of the induced flow in the molten material is on the order of one-half the diameter of the jet-formed slag depression.

2. A method for treatment of molten slag having heavy metal oxides for the recovery of valuable metals contained therein through precipitation during the slag melting and volatilizing out of the slag melting bath in accordance with the steps of claim 1:

wherein the spacing of the vertical location of the nozzle relative to the surface of the slag and the force of the gases issuing from the nozzle are adjusted so that the slag melt does not form a spray in its movement onto the center of the depression induced by said jet.

3. A method for treatment of molten slag having heavy metal oxides for the recovery of valuable metals contained therein through precipitation during the slag melting and volatilizing out of the slag melting bath in accordance with the steps of claim 1:

wherein a Laval nozzle is used and increased gas pressures and greater quantities can be blown.

4. A method for treatment of molten slag having heavy metal oxides for the recovery of valuable metals contained therein through precipitation during the slag melting and volatilizing out of the slag melting bath in accordance with the steps of claim 1:

wherein a plurality of jets are blown onto the surface of the slag at laterally spaced locations wherein the spacing is in the range of 2 to 5 times the diameter of the jet-induced depression in the slag.

5. A method for treatment of molten slag having heavy metal oxides for the recovery of valuable metals contained therein through precipitation during the slag melting and volatilizing out of the slag melting bath in accordance with the steps of claim 1:

wherein the diameter of the induced flow is on the order of 3 times the horizontal diameter of the slag depression induced by the jet.

6. A method for treatment of molten slag having heavy metal oxides for the recovery of valuable metals contained therein through precipitation during the slag melting and volatilizing out of the slag melting bath in accordance with the steps of claim 1:

wherein the reaction gases are a mixture of oxidizing and reducing gases to react with the components of the slag and contribute heat energy through combustion.

* * * * *